US008911185B2

(12) United States Patent
Nagaya et al.

(10) Patent No.: US 8,911,185 B2
(45) Date of Patent: Dec. 16, 2014

(54) DETACHABLE INSERT TYPE CUTTING TOOL

(75) Inventors: Hidehiko Nagaya, Schaumburg, IL (US); Norio Aso, Joso (JP); Shoichiro Watanabe, Anpachi-gun (JP); Yasuharu Imai, Joso (JP); Kenji Ishizawa, Joso (JP)

(73) Assignee: Mitsubishi Materials Corporation, Tokyo (JP)

( * ) Notice: Subject to any disclaimer, the term of this patent is extended or adjusted under 35 U.S.C. 154(b) by 218 days.

(21) Appl. No.: 13/696,554

(22) PCT Filed: May 11, 2011

(86) PCT No.: PCT/JP2011/060850
§ 371 (c)(1),
(2), (4) Date: Nov. 6, 2012

(87) PCT Pub. No.: WO2011/142387
PCT Pub. Date: Nov. 17, 2011

(65) Prior Publication Data
US 2013/0051942 A1 Feb. 28, 2013

(30) Foreign Application Priority Data

May 11, 2010 (JP) .................................. 2010-109595

(51) Int. Cl.
*B23B 27/04* (2006.01)
*B26D 3/06* (2006.01)
*B23B 27/08* (2006.01)
*B23B 29/04* (2006.01)

(52) U.S. Cl.
CPC ............. *B23B 29/043* (2013.01); *B23B 27/086* (2013.01); *B23B 2220/126* (2013.01)
USPC ................ 407/117; 407/109; 407/91; 407/50

(58) Field of Classification Search
CPC .... B23B 2205/02; B23B 29/043; B23B 22/04
USPC ....................... 407/113, 117, 107–110, 50, 91
See application file for complete search history.

(56) References Cited

U.S. PATENT DOCUMENTS 1,940,220 A * 12/1933 McGrath .......................... 408/59
4,096,613 A *  6/1978 Takacs et al. ..................... 407/92
(Continued)

FOREIGN PATENT DOCUMENTS

CN          1059487 A      3/1992
JP       03-142102 A      6/1991
(Continued)

OTHER PUBLICATIONS

Notice of Allowance dated Feb. 19, 2014, issued for the Chinese patent application No. 201180017133.4 and English translation thereof.
(Continued)

*Primary Examiner* — Andrea Wellington
*Assistant Examiner* — Sara Addisu
(74) *Attorney, Agent, or Firm* — Edwards Wildman Palmer LLP

(57) ABSTRACT

This detachable insert type cutting tool is provided with a cutting insert and a holder which holds the cutting insert. An insert mounting seat on which the cutting insert is mounted and upper and lower jaw sections which pinch the cutting insert are provided in the holder. The insert mounting seat is provided between the lower surface of the upper jaw section and the upper surface of the lower jaw section. Convex curve outer surfaces are formed on one side of the upper and lower jaw sections when viewed from the leading end sides of the upper and lower jaw sections, and concave curve inner surfaces are formed on the other side of the upper and lower jaw sections. In a state where the cutting insert is fixed to the insert mounting seat, the concave curve inner surface of the upper jaw section is disposed at a position retreated further radially outward than an arc surface extending along the concave curve inner surface of the lower jaw section.

8 Claims, 10 Drawing Sheets

(56) References Cited

U.S. PATENT DOCUMENTS

| | | | |
|---|---|---|---|
| 4,332,513 A * | 6/1982 | Gowanlock | 407/101 |
| 4,674,371 A * | 6/1987 | Smolders | 82/158 |
| 5,156,502 A * | 10/1992 | Satran | 407/110 |
| 5,159,863 A | 11/1992 | Simpson, III | |
| 8,425,161 B2 * | 4/2013 | Nagaya et al. | 407/107 |
| 2009/0035075 A1 * | 2/2009 | Hecht et al. | 407/104 |
| 2010/0178117 A1 * | 7/2010 | Watanabe et al. | 407/11 |

FOREIGN PATENT DOCUMENTS

| | | |
|---|---|---|
| JP | 2007-168044 A | 7/2007 |
| JP | 2009-107071 A | 5/2009 |

OTHER PUBLICATIONS

International Search Report dated Jul. 26, 2011, issued for PCT/JP2011/060850.

* cited by examiner

DETACHABLE INSERT TYPE CUTTING TOOL

TECHNICAL FIELD

The present invention relates to a detachable insert type cutting tool.

Priority is claimed on Japanese Patent Application No. 2010-109595 filed May 11, 2010, the content of which is incorporated herein by reference.

BACKGROUND ART OF THE INVENTION

In the following Patent Document 1, a detachable insert type cutting tool is disclosed which is used for grooving work of an end face. In this cutting tool, as shown in FIG. 15, an upper jaw section 102 and a lower jaw section 103 which pinch and fix a cutting insert 100 from the upper and lower directions are provided in a head member main body 101 on which the cutting insert 100 is detachably mounted. An insert mounting seat 104 for cutting insert mounting is provided between the lower surface of the upper jaw section 102 and the upper surface of the lower jaw section 103 which face each other. Curved convex curve outer surfaces 105 are formed on one side of the upper and lower jaw sections 102 and 103 when viewed from the leading end sides of the upper and lower jaw sections 102 and 103, and curved concave curve inner surfaces 106 are formed on the other side of the upper and lower jaw sections 102 and 103, whereby the upper jaw section 102 and the lower jaw section 103 are formed in arch shapes when viewed from the leading end sides.

In addition, in FIG. 15, Xa denotes a locus of a work material which passes an inner corner portion 100a of a cutting edge of the cutting insert 100, Xb denotes a locus of the work material which passes an outer corner portion 100b of the cutting edge of the cutting insert 100, and an area between the loci Xa and Xb is subjected to grooving work. Further, Oa denotes the rotation center of the work material.

CITATION LIST

Patent Document

Patent Document 1: Japanese Unexamined Patent Application, First Publication No. 2007-168044

DETAILED DESCRIPTION OF THE INVENTION

Problems to be solved by the Invention

In the detachable insert type cutting tool described above, as shown in FIG. 15, usually, a concave curve inner surface 106a of the upper jaw section and a concave curve inner surface 106b of the lower jaw section are formed on the same arc surface S centered on Oa. That is, generally, a clearance C1 between the concave curve inner surface 106a of the upper jaw section and the locus Xa of the work material and a clearance C2 between the concave curve inner surface 106b of the lower jaw section and the locus Xa of the work material are set to be the same value.

Further, during actual cutting work, since a cutting load F is applied to a cutting edge of the cutting insert 100, the cutting insert 100 is deformed in a direction (a lower left direction in FIG. 15) in which the cutting load F is applied, as shown by an arrow AF in FIG. 16, under the cutting load F. As a result, the upper jaw section 102 and the lower jaw section 103 are also deformed in the same direction. In FIG. 16, a locus of the work material which passes the inner corner portion 100a of the cutting edge of the cutting insert 100 during cutting work is denoted by Xc and a locus of the work material which passes the outer corner portion 100b of the cutting edge of the cutting insert 100 during cutting work is denoted by Xd.

In the detachable insert type cutting tool described above, during actual cutting work, as shown in FIG. 16, while a clearance C4 between the concave curve inner surface 106b of the lower jaw section and the locus Xc of the work material is kept relatively wide, a clearance C3 between the concave curve inner surface 106a of the upper jaw section and the locus Xc of the work material becomes narrow. Thus, in an extreme case, there is a possibility that the convex curve inner surface 106b of the upper jaw section may interfere with the work material.

The present invention has been made in view of such circumstances and has an object of providing a detachable insert type cutting tool in which not only during non-working, but also during cutting work, interference of an upper jaw section with a work material can be avoided.

Means for solving the Problem

A detachable insert type cutting tool according to the invention includes a cutting insert having a cutting edge, and a holder which holds the cutting insert. The holder has an insert mounting seat on which the cutting insert is detachably mounted, and an upper jaw section and a lower jaw section for pinching and fixing the cutting insert. The insert mounting seat is provided between the lower surface of the upper jaw section and the upper surface of the lower jaw section. Convex curve outer surfaces are formed on one side of the upper and lower jaw sections when viewed from the leading end sides of the upper and lower jaw sections, and concave curve inner surfaces are formed on the other side of the upper and lower jaw sections. In a state where the cutting insert is fixed to the insert mounting seat, the concave curve inner surface of the upper jaw section is disposed at a position retreated further radially outward than an arc surface extending along the concave curve inner surface of the lower jaw section.

A holder for a detachable insert type cutting tool according to the invention includes a holder main body, an insert mounting seat which is provided in the holder main body and on which a cutting insert having a cutting edge is detachably mounted, and an upper jaw section and a lower jaw section for pinching and fixing the cutting insert. The insert mounting seat is provided between the lower surface of the upper jaw section and the upper surface of the lower jaw section. Convex curve outer surfaces are formed on one side of the upper and lower jaw sections when viewed from the leading end sides of the upper jaw section and the lower jaw section, and concave curve inner surfaces are formed on the other side of the upper and lower jaw sections. The concave curve inner surface of the upper jaw section is formed so as to be disposed at a position retreated further radially outward than an arc surface extending along the concave curve inner surface of the lower jaw section in a state where the cutting insert is fixed to the insert mounting seat.

The holder for a detachable insert type cutting tool according to the invention may include a head member having the insert mounting seat, the upper jaw section, and the lower jaw section, and the head member may be separated from the holder main body.

A head member for a detachable insert type cutting tool according to the invention includes an insert mounting seat on which a cutting insert having a cutting edge is detachably mounted, and an upper jaw section and a lower jaw section for pinching and fixing the cutting insert. The insert mounting seat is provided between the lower surface of the upper jaw section and the upper surface of the lower jaw section. Convex curve outer surfaces are formed on one side of the upper and lower jaw sections when viewed from the leading end sides of the upper jaw section and the lower jaw section, and concave curve inner surfaces are formed the other side of the upper and lower jaw sections. The concave curve inner surface of the upper jaw section is formed so as to be disposed at a position retreated further radially outward than an arc surface extending along the concave curve inner surface of the lower jaw section in a state where the cutting insert is fixed to the insert mounting seat.

In the invention, the amount of retreat of the concave curve inner surface of the upper jaw section from the arc surface may be in a range of 0.2 mm to 0.7 mm.

According to the invention, in a state where the cutting insert is fixed to the insert mounting seat, the concave curve inner surface of the upper jaw section is disposed at a position retreated further radially outward than the arc surface extending along the concave curve inner surface of the lower jaw section. That is, a clearance between the concave curve inner surface of the upper jaw section and the locus of a work material which passes an inner corner portion of a cutting edge of the cutting insert is larger than a clearance between the concave curve inner surface of the lower jaw section and the locus of the work material which passes the inner corner portion of the cutting edge of the cutting insert. Due to this, when actually performing cutting of the work material, even if the head member is deformed under a load, so that the cutting insert is deformed, interference of the upper jaw section with the work material can be avoided.

In addition, it is considered that not only the clearance between the concave curve inner surface of the upper jaw section and the locus of the work material which passes the inner corner portion of the cutting edge of the cutting insert, but also the clearance between the concave curve inner surface of the lower jaw section and the locus of the work material which passes the inner corner portion of the cutting edge of the cutting insert is set large in advance. However, in this case, the thicknesses of both the upper jaw section and the lower jaw section become thinner, so that desired rigidity cannot be obtained.

The amount of retreat of the concave curve inner surface of the upper jaw section from the arc surface may be set to be in a range of 0.2 mm to 0.7 mm. If it is within this range, even during cutting work, interference of the upper jaw section with the work material can be sufficiently avoided.

In a case where the amount of retreat of the concave curve inner surface of the upper jaw section from the arc surface is smaller than 0.2 mm, when cutting conditions are severe, a possibility that the upper jaw section may interfere with the work material remains. Further, in a case where the amount of retreat of the concave curve inner surface of the upper jaw section from the arc surface is larger than 0.7 mm, although interference of the upper jaw section with the work material can be sufficiently avoided, the thickness of the upper jaw section becomes thinner. For this reason, the rigidity of the upper jaw section becomes low, so that it becomes difficult to obtain desired working accuracy.

Advantageous Effects of the Invention

According to the invention, interference of the upper jaw section with a work material during cutting work can be avoided while maintaining desired rigidity.

DESCRIPTION OF EMBODIMENTS

Figure 1:
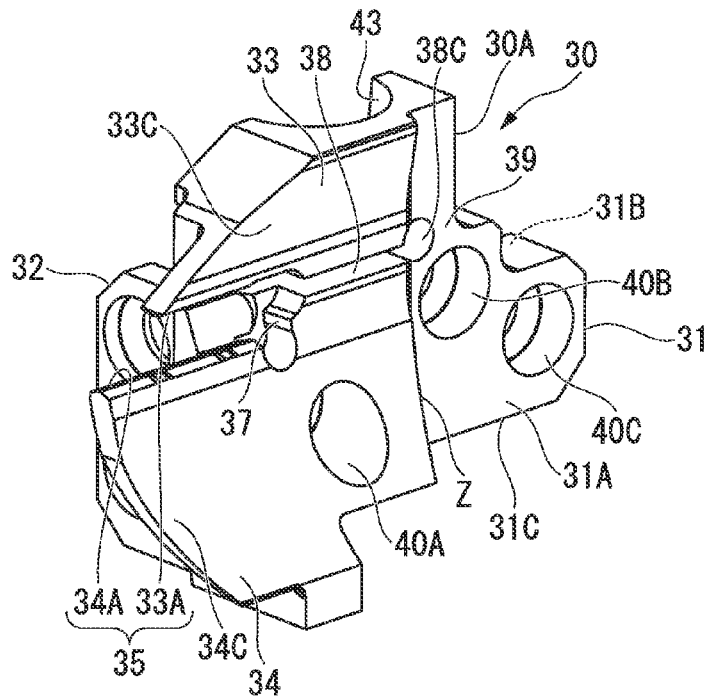
FIG. 1 is a perspective view of a head member of an embodiment of the invention, as viewed toward the leading end upper side and the leading end side from the right side.
Figure 2:
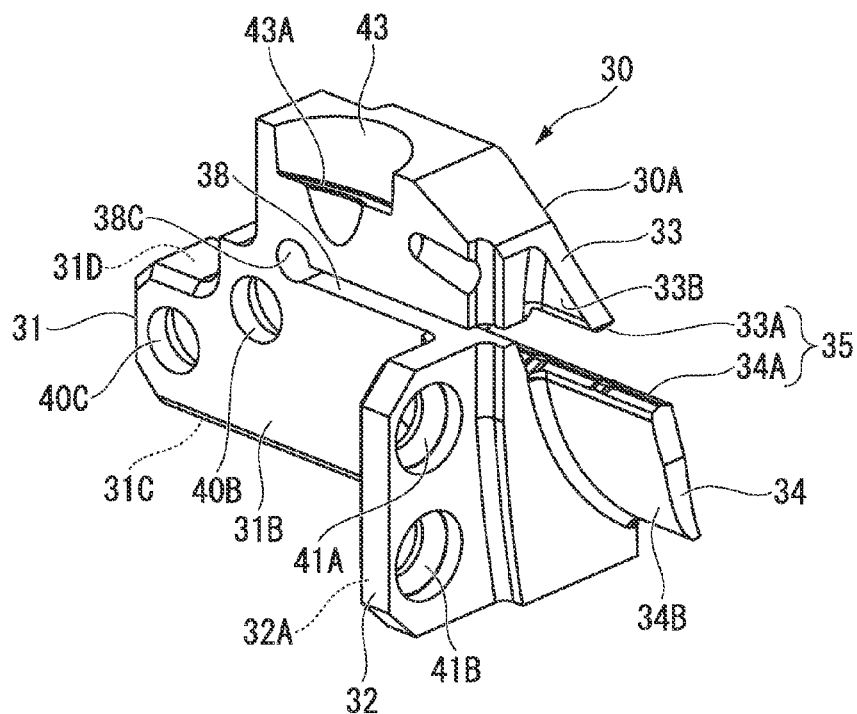
FIG. 2 is a perspective view of the head member of the embodiment shown in FIG. 1, as viewed toward the leading end upper side and the leading end side from the left side.
Figure 3:
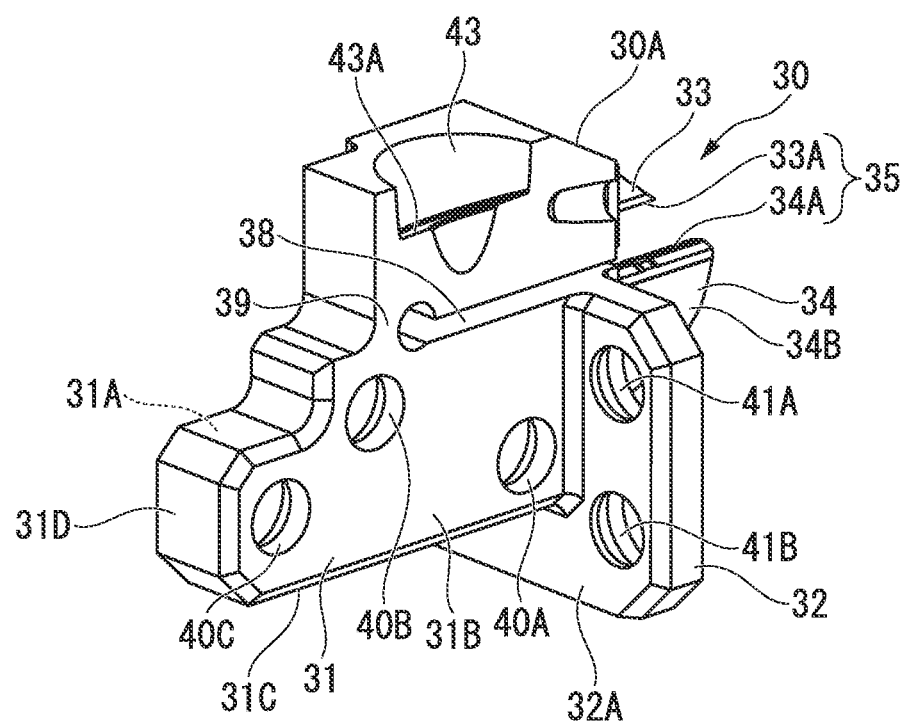
FIG. 3 is a perspective view of the head member of the embodiment shown in FIG. 1, as viewed toward the rear end lower side and the rear end side from the right side.

FIGS. 1 to 3 show an embodiment of a head member according to the invention and FIGS. 4 to 8 show an embodiment of a detachable insert type cutting tool according to the invention in which the head member of the embodiment is mounted on a holder main body.

Figure 4:
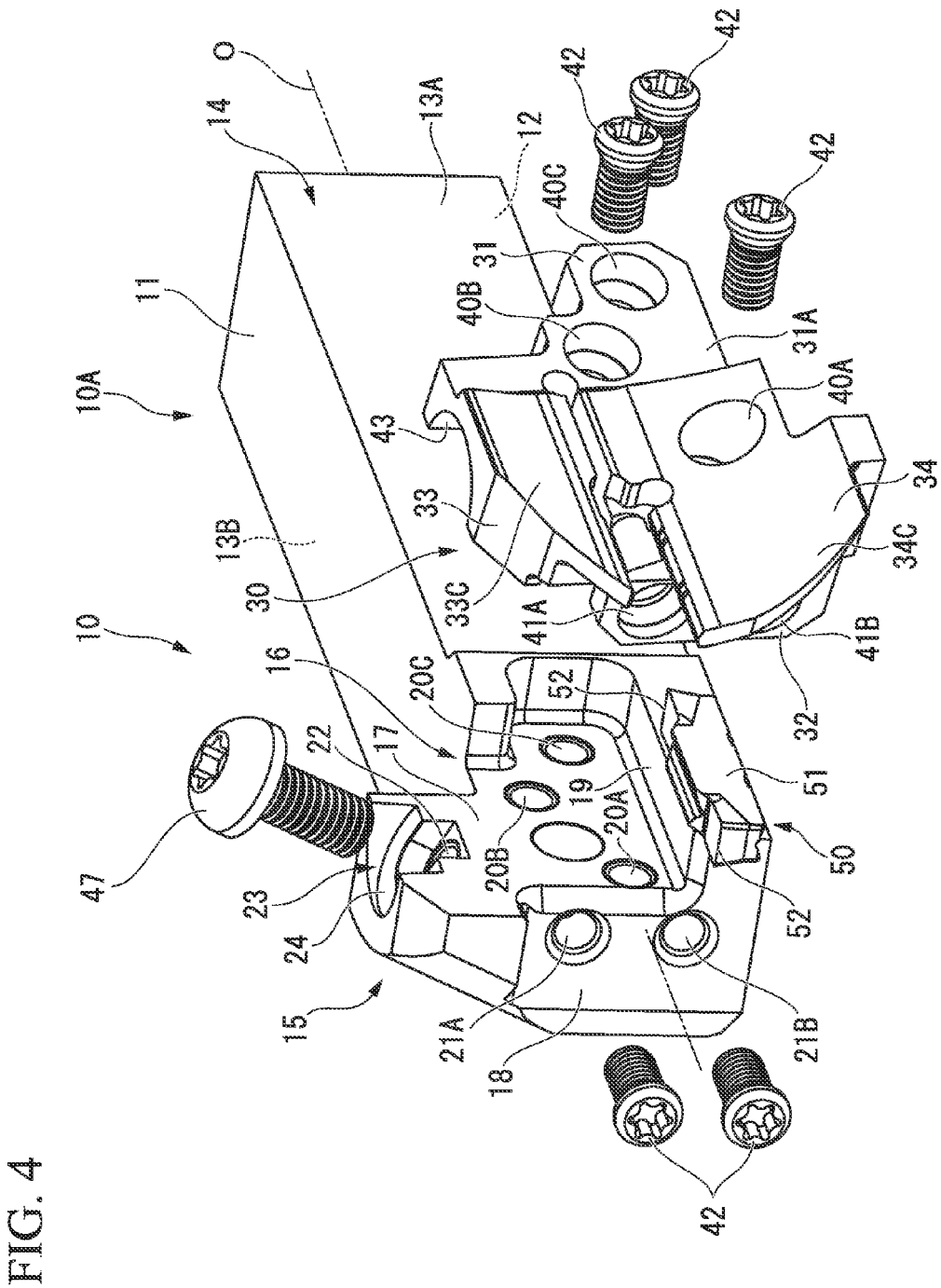
FIG. 4 is an exploded perspective view of a cutting tool of an embodiment of the invention, on which the head member shown in FIG. 1 is mounted, as viewed toward the leading end upper side and the leading end side from the right side.
Figure 5:
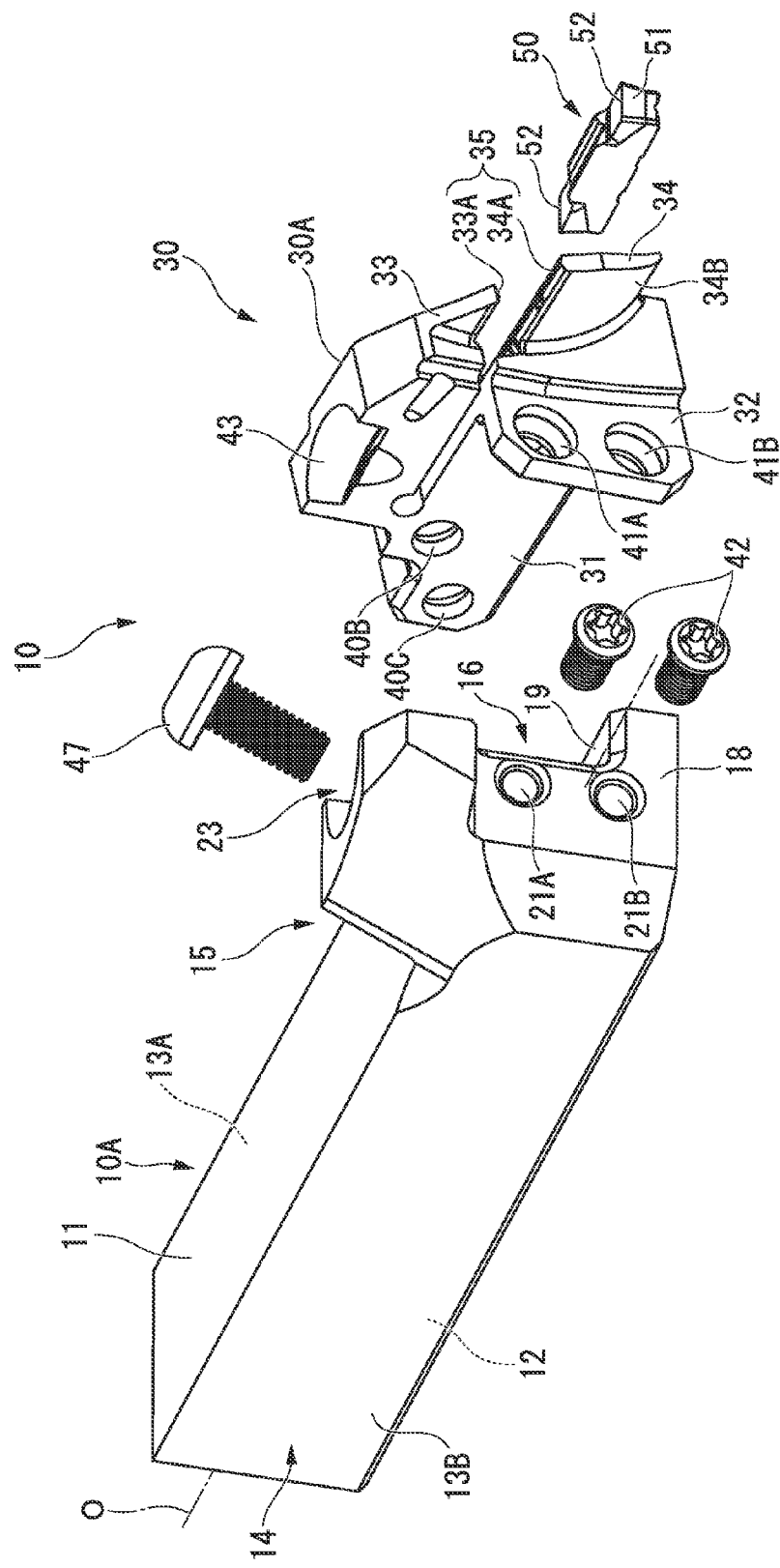
FIG. 5 is an exploded perspective view of the cutting tool of an embodiment of the invention, on which the head member shown in FIG. 1 is mounted, as viewed toward the leading end upper side and the leading end side from the left side.
Figure 6:
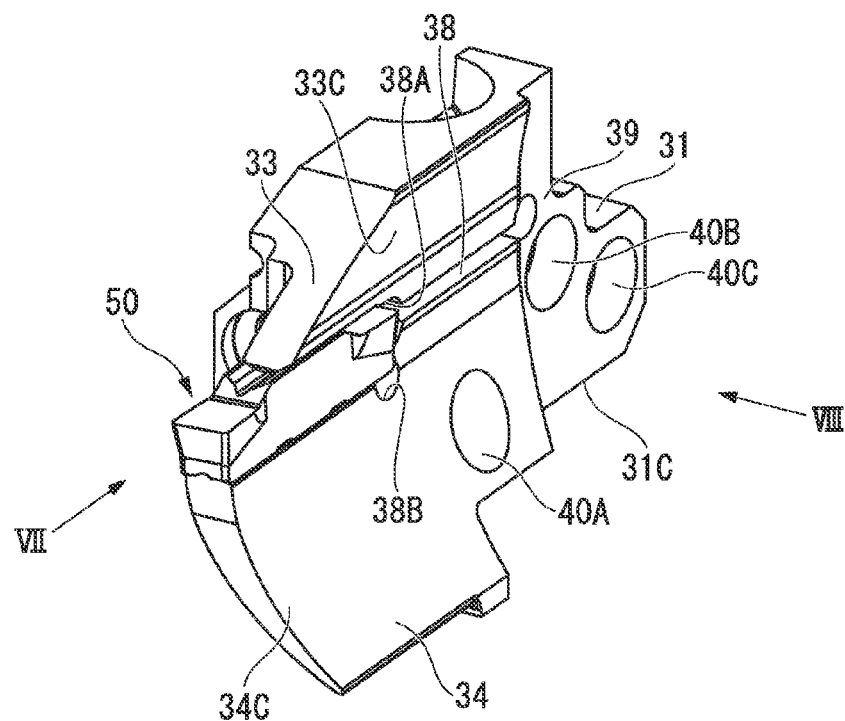
FIG. 6 is a perspective view showing a state where a cutting insert is assembled to the head member shown in FIG. 1.

As shown in FIGS. 4 and 5, the detachable insert type cutting tool of this embodiment is a detachable insert type turning tool (bite) which performs grooving work on a rotating work material. This cutting tool is provided with a holder 10 which is held by a tool rest of a machine tool, and a cutting insert 50 which is clamped to a leading end of the holder 10.

The holder 10 includes a holder main body 10A having an approximately quadrangular prism shape, and a head member 30 which is mounted on a leading end of the holder main body 10A.

The holder main body 10A is formed of a material such as a steel and has an approximately square prism shape having an upper surface 11 and a lower surface 12 which face each other and a pair of side surfaces 13A and 13B. The rear end side (the upper right side in FIG. 4 and the upper left side in FIG. 5) of the holder main body 10A becomes a shank portion 14 which extends along a central axis O of the square prism. A protruding portion 15 which protrudes upward from the upper surface 11 of the holder main body 10A is formed on the leading end side (the lower left side in FIG. 4 and the lower right side in FIG. 5) of the holder main body 10A. A mounting section 16 for mounting the head member 30 is provided in a leading end portion of the holder main body 10A where the protruding portion 15 is formed.

The mounting section 16 is formed in a concave shape so as to cut out the leading end face of the holder main body 10A and the portion on the side surface 13A side on one side of the leading end portion. The mounting section 16 is provided with a first receiving surface 17, a second receiving surface 18, and a third receiving surface 19. The first receiving surface 17 has a planar shape which extends parallel to the side surface 13A of the holder main body 10A. The second receiving surface 18 has a planar shape which extends in a direction orthogonal to the first receiving surface 17 and also crosses the axis O at right angles, and is directed to the leading end side of the holder main body 10A. The third receiving surface 19 has an upward planar shape which extends in a direction orthogonal to the first and second receiving surfaces 17 and 18.

The first receiving surface 17 is formed so as to be recessed from the side surface 13A to the side surface 13B side and extended to an upper end of the protruding portion 15. Then, in the first receiving surface 17, each of first fixing screw holes 20A to 20C, three in this embodiment, is perforated in a direction orthogonal to the first receiving surface 17. The first fixing screw holes 20A to 20C are arranged in the direction of the axis O, that is, in the front-back direction of the holder main body 10A and opened at the positions of the respective vertexes of a scalene triangle that is vertically flattened and is convex upward, as shown in FIG. 4.

Further, the second receiving surface 18 is disposed in a direction orthogonal to the leading end side in the direction of the axis O of the first receiving surface 17 through a chamfered portion, and formed so as to be recessed further to the rear end side than the leading end face of the protruding portion 15 and form an L shape when viewed from the leading end side. In the second receiving surface 18, two second fixing screw holes 21A and 21B perforated in a direction orthogonal to the second receiving surface 18 are opened so as to be arranged in a direction orthogonal to the axis O and extending parallel to the first receiving surface 17, that is, opened side by side in the vertical direction of the holder main body 10A in this embodiment.

In addition, the third receiving surface 19 is disposed between the first receiving surface 17 recessed to the side surface 13B side and a side surface which is directed to the side surface 13A side of the leading end portion of the holder main body 10A, and formed so as to extend orthogonal to the first receiving surface 17 and parallel to the axis O. The third receiving surface 19 extends in a direction orthogonal to the second receiving surface 18 through a chamfered portion on the leading end side thereof. In addition, the rear end side of the mounting section 16 having a concave shape is opened to the leading end side when viewed from a direction facing the side surface 13A. The first and third receiving surfaces 17 and 19 are provided to extend to portions on the rear end side, and the first fixing screw hole 20C on the rearmost end side among the first fixing screw holes 20A to 20C is perforated in the portion on the rear end side.

Further, the first fixing screw hole 20A on the leading edge side among the first fixing screw holes 20A to 20C and the second fixing screw holes 21A and 21B are respectively disposed so as to be at different positions in a direction extending orthogonal to the axis O and parallel to the first receiving surface 17, that is, in the vertical direction in this embodiment. In this embodiment, the first fixing screw hole 20A on the leading end side is disposed between the second fixing screw holes 21A and 21B disposed up and down, as shown in FIG. 4.

Further, in the protruding portion 15, a clamp screw hole 22, which is inclined so as to become more distant at a predetermined angle with respect to the first receiving surface 17 as it goes downward in a plane orthogonal to the axis O, is perforated downward from an upper end portion of the protruding portion 15. A stepped concave portion 23 opened larger than the clamp screw hole 22 is formed around an upper end opening portion of the clamp screw hole 22, and the side surface 13A side of the concave portion 23 is opened to the first receiving surface 17 to intersect an upper end portion of the first receiving surface 17. In addition, a step surface 24 of the concave portion 23 is perpendicular to the central line of the clamp screw hole 22 and is inclined to form an obtuse angle with respect to the first receiving surface 17 so as to gradually retreat downward as it goes to the side surface 13A.

The head member 30 of this embodiment which is mounted on the mounting section 16 of the holder main body 10A is provided with a head member main body 30A, an insert mounting seat 35, an upper jaw section 33, and a lower jaw section 34. The head member main body 30A, the insert mounting seat 35, the upper jaw section 33, and the lower jaw section 34 are integrally formed by performing cutting work on a steel material. As shown in FIGS. 1 to 3, the head member main body 30A has a rear end portion 31 thickened in thickness with respect to a jaw section (a left side portion in FIG. 1) on the leading end side, a protruding wall portion 32 which protrudes to the left side when viewed from the front side in the front end of the rear end portion 31, and a jaw section composed of the upper jaw section 33 on the upper side and the lower jaw section 34 on the lower side paired with each other on the front end side.

In the rear end portion 31, a side surface (a side surface on the right side in FIG. 1) 31A on one side of the head member main body 30A, which is directed to the same side as the side surface 13A of the holder main body 10A in a mounted state on the holder main body 10A, and a side surface (a side surface on the left side in FIG. 2) 31B on the other side opposite to the side surface 31A are disposed in a parallel fashion. Further, a lower end face 31C of the rear end portion 31 is orthogonal to the side surface on one side and the side surface on the other side and is disposed so as to be parallel to the axis O in a state where the head member 30 is mounted on the holder main body 10A. Further, in the head member main body 30A, a backward overhanging position Z of each of the upper jaw section 33 and the lower jaw section 34 in the side surface 31A is set so as to be located further rearward than the front end of the side surface 31B.

The protruding wall portion 32 is formed integrally with the head member main body 30A. A back surface 32A being directed to the rear end side of the protruding wall portion 32 is made so as to extend in a direction perpendicular to the axis O in a state where the head member 30 is mounted on the holder main body 10A. In addition, the side surface 31B in a rear end portion of the head member main body 30A except the protruding wall portion 32 has a planar shape when viewed in the upper and lower surfaces.

Figure 7:
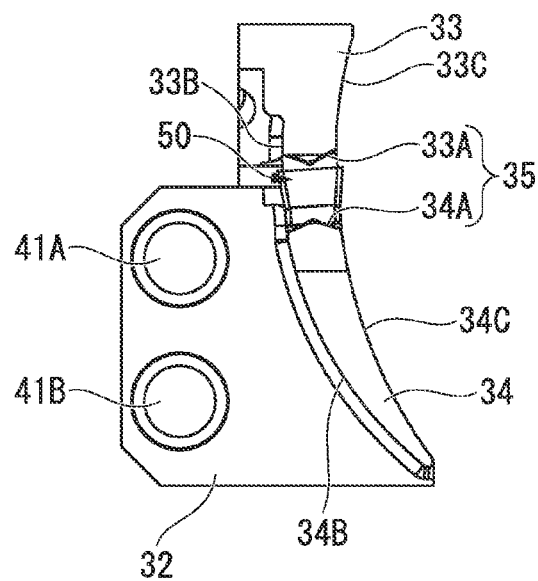
FIG. 7 is a diagram showing the head member with the cutting insert assembled thereto when viewed from a direction of an arrow VII in FIG. 6.

On the other hand, the jaw section composed of the upper jaw section 33 and the lower jaw section 34, which extends toward the leading end side so as to follow the side surface 13A of the holder main body 10A in a state where the head member 30 is mounted on the holder main body 10A, is formed at a leading end portion of the head member main body 30A. The jaw sections pinch and fix the cutting insert 50 from upper and lower directions. A pressing surface 33A which presses the cutting insert 50 from above is provided at the upper jaw section 33 and also a pedestal surface 34A which is disposed to face the pressing surface 33A is provided at the lower jaw section 34. In this embodiment, the insert mounting seat 35 having a concave shape which is opened to the leading end side as shown in FIG. 1 is formed by the pressing surface 33A and the pedestal surface 34A. In addition, as shown in FIG. 7, the outer shape of the pedestal surface 34A when viewed from the leading end side has an inverted V shape which is convex upward, and the outer shape of the pressing surface 33A has a V shape which is convex downward.

Convex curve outer surfaces 33B and 34B which form a portion of the outer circumferential surface of a cylindrical body are respectively provided at the side surfaces on one side when viewed from the leading end side of the upper jaw section 33 and the lower jaw section 34, and concave curve inner surfaces 33C and 34C which form a portion of the inner circumferential surface of the cylindrical body are respectively provided at the side surfaces on the other side of the upper jaw section 33 and the lower jaw section 34. Then, due to the convex curve outer surfaces 33B and 34B and the concave curve inner surfaces 33C and 34C, the upper jaw section 33 and the lower jaw section 34 are formed in successive arches when viewed from the leading end side.

Figure 8:
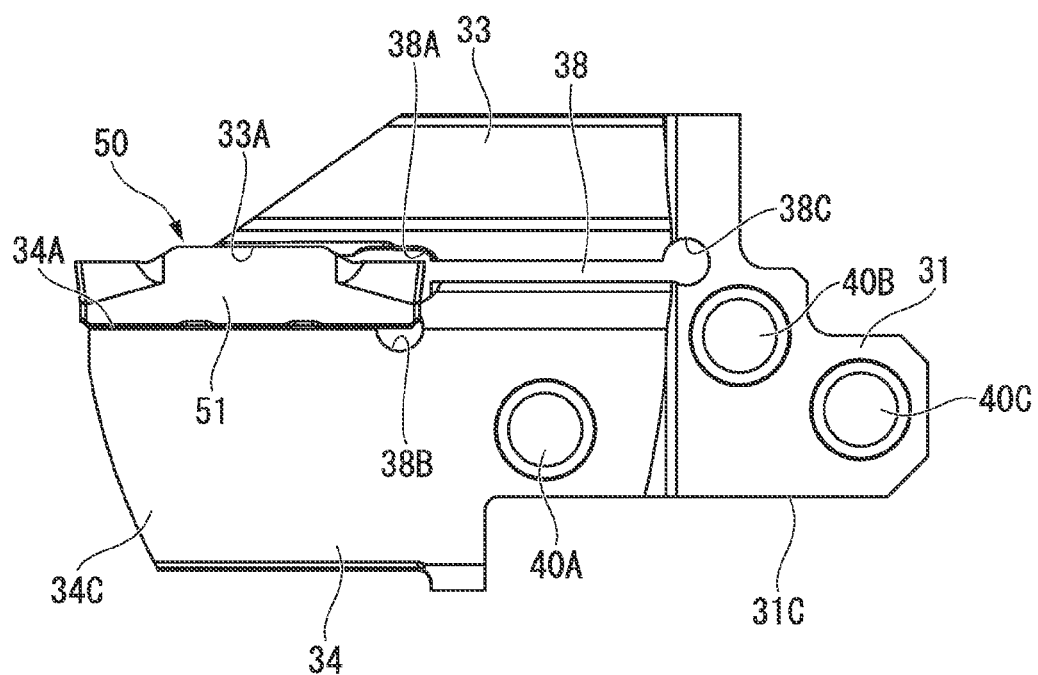
FIG. 8 is a diagram showing the head member with the cutting insert assembled thereto when viewed from a direction of an arrow VIII in FIG. 6.

The upper jaw section 33 is formed such that a front end is inclined so as to gradually retreat backward as it goes upward when viewed from the side, as shown in FIG. 8. Further, a rear end of the upper jaw section 33 is formed at a slant so as to slightly advance forward as it goes upward. On the other hand, the front end of the lower jaw section 34 is formed in an arc shape so as to gradually retreat backward as it goes downward. Further, a rear end of the lower jaw section 34 is formed in an arc shape so as to slightly advance forward as it goes downward.

Figure 9:
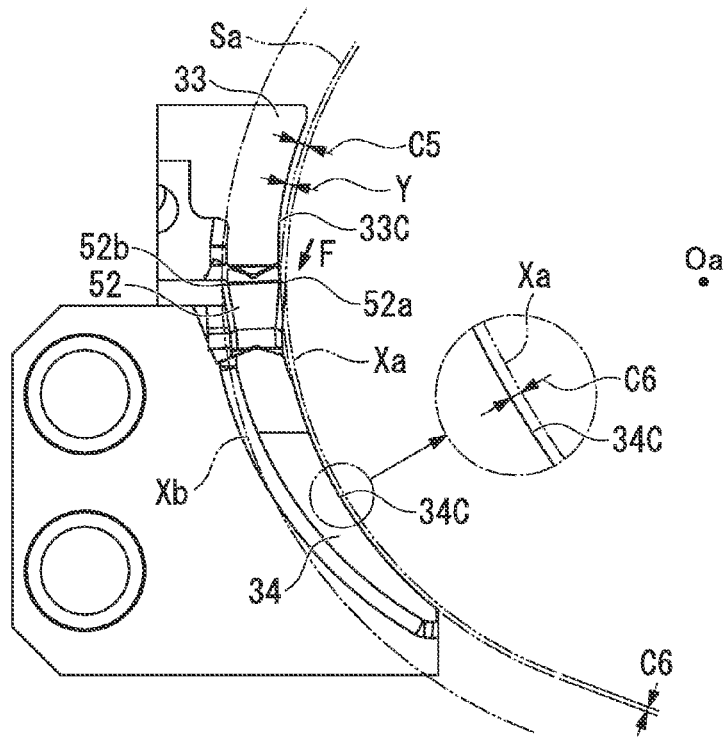
FIG. 9 is a diagram showing the relationship between the head member of the embodiment shown in FIG. 1 and a work material.

As shown in FIG. 9, the concave curve inner surface 33C of the upper jaw section is formed to retreat further radially outward than an imaginary arc surface Sa which extends along the concave curve inner surface 34C of the lower jaw section. Specifically, an arc center of the concave curve inner surface 33C of the upper jaw section and an arc center of the concave curve inner surface 34C of the lower jaw section are the same point and are a rotation center Oa of the work material. However, the radius of curvature of the concave curve inner surface 33C of the upper jaw section is set larger than the radius of curvature of the concave curve inner surface 34C of the lower jaw section. That is, the concave curve inner surface 33C of the upper jaw section is formed to retreat further radially outward by a difference Y between the radii of curvature than the arc surface Sa which extends along the concave curve inner surface 34C of the lower jaw section.

Then, the difference Y between the radius of curvature of the concave curve inner surface 33C of the upper jaw section and the radius of curvature of the concave curve inner surface 34C of the lower jaw section, in other words, the amount of retreat of the concave curve inner surface 33C of the upper jaw section from the arc surface Sa is set to be in a range of 0.2 mm to 0.7 mm.

In addition, in FIG. 9, Xa denotes a locus of the work material which passes an inner corner portion 52a of a cutting edge of the cutting insert 50, and Xb denotes a locus of the work material which passes an outer corner portion 52b of the cutting edge of the cutting insert 50. As can be seen from FIG. 9, in this embodiment, in a state before cutting work, the concave curve inner surface 33C of the upper jaw section is formed to retreat further radially outward than the arc surface Sa which extends along the concave curve inner surface 34C of the lower jaw section. For this reason, a clearance C5 between the concave curve inner surface 33C of the upper jaw section and the locus Xa of the work material is made larger than a clearance C6 between the concave curve inner surface 34C of the lower jaw section and the locus Xa of the work material. In this embodiment, the radius of curvature of the concave curve inner surface 34C of the lower jaw section is set to be 60 mm and also the clearance C5 and the clearance C6 are respectively set to be 0.7 mm and 0.3 mm.

As shown in FIG. 1, in the back of the insert mounting seat 35 on the rear end side between the pressing surface 33A and the pedestal surface 34A, a contact surface 37 which is directed to the leading end side perpendicularly to the axis O in a state where the head member 30 is mounted on the holder main body 10A is formed on the pedestal surface 34A side. Further, a slit 38 which passes through an overlap portion of the rear end portion 31 and the jaw section of the head member main body 30A perpendicularly to the side surfaces 31A and 31B and extends parallel to the axis O and toward the rear end side is formed from between the contact surface 37 and the pressing surface 33A, and the upper jaw section 33 can be elastically deformed so as to bend toward the lower jaw section 34 side with a connection portion 39 with the lower jaw section 34 of a rear end of the slit 38 as a fulcrum.

At the front end of the slit 38, an arc-shaped cutout 38A is formed on the upper jaw section 33 side and an arc-shaped cutout 38B is formed on the lower jaw section 34 side, and thus, when the cutting insert is inserted and clamped, rear end corner portions of the cutting insert 50 do not interfere with the upper and lower jaw sections.

Further, as shown in FIGS. 1 and 2, the lower jaw section 34 protrudes further to the leading end side than the upper jaw section 33 and is also connected to the protruding wall portion 32 with a lower end thereof located further to the lower side than the lower end face 31C of the rear end portion of the head member main body 30A and further to the upper side than a lower end of the protruding wall portion 32. In addition, the lower end face 31C of the rear end portion has a planar shape perpendicular to the side surfaces 31A and 31B and is provided to extend parallel to the axis O in a state where the head member 30 is mounted on the holder main body 10A.

The head member 30 is seated by inserting the rear end portion of the head member main body 30A into the concave mounting section 16 of a leading end of the holder main body 10A, bringing the side surface 31B of the rear end portion into close contact with the first receiving surface 17 of the mounting section 16, bringing the back surface 32A of the protruding wall portion 32 into close contact with the second receiving surface 18, and bringing the lower end face 31C of the rear end portion into close contact with the third receiving surface 19. Here, in the rear end portion of the head member main body 30A and the protruding wall portion 32, three first insertion holes 40A to 40C and two second insertion holes 41A and 41B are respectively formed at positions corresponding to the first fixing screw holes 20A to 20C and the second fixing screw holes 21A and 21B in a state where the head member 30 is mounted in the way described above.

The first insertion holes 40A to 40C and the second insertion holes 41A and 41B are formed in a circular shape in cross-section so as to pass through the rear end portion and the protruding wall portion 32. However, the bottom side of the hole is reduced in diameter such that the back surface of a head portion of a fixing screw 42, which will be described later, comes into contact with the bottom side. Further, in a state where the head member 30 is seated on the mounting section 16, as described above, the centers of the first insertion holes 40A to 40C are slightly eccentric diagonally to the leading end side and the upper side of the holder main body 10A with respect to the centers of the first fixing screw holes 20A to 20C so as to become distant from the third receiving surface 19 and come close to the second receiving surface 18 side. The centers of the second insertion holes 41A and 41B are slightly eccentric diagonally to the side surface 13A side and the upper side with respect to the centers of the second fixing screw holes 21A and 21B so as to become distant from the lower surface 12 of the holder main body 10A and come close to the first receiving surface 17.

Therefore, in a state where the head member 30 is mounted on the mounting section 16 in this way, as shown in FIGS. 4 and 5, the fixing screws 42 are inserted into the first and second insertion holes 40A to 40C, 41A, and 41B and then screwed into the first and second fixing screw holes 20A to 20C, 21A, and 21B. In this way, the side surface 31B of the rear end portion of the head member main body 30A of the head member 30 is pressed against the first receiving surface 17 and also the back surface 32A of the protruding wall portion 32 is pressed against the second receiving surface 18. Further, the lower end face 31C of the rear end portion is pressed against and fixed to the third receiving surface 19, thereby being mounted on the mounting section 16.

That is, in the head member 30, the side surface 31B of the rear end portion, the back surface 32A of the protruding wall portion, and the lower end face 31C of the rear end portion, which are orthogonal to each other, become contact reference planes which respectively come into contact with the first to third receiving surfaces 17, 18, and 19 when mounting the head member 30 on the mounting section 16 of the holder main body 10A.

In addition, a rear end face 31D of the rear end portion 31 of the head member main body 30A is formed so as to be perpendicular to the side surfaces 31A and 31B and advance toward the lower end face 31C while forming a stairs shape toward the rear end side in a side surface view opposite to the side surface 31A, as shown in FIG. 3. A square convex portion which is formed by a step portion on the rearmost end side of these and the lower end face 31C is accommodated in a concave portion opened to the above-described leading end side on the rear end side of the mounting section 16. In the convex portion, the first insertion hole 40C of the rearmost end among the first insertion holes 40A to 40C is formed. However, the rear end face 31D is spaced so as not to come into contact with a wall surface which is directed to the leading end side of the mounting section 16 in a state where the head member 30 is mounted on the holder main body 10A. Further, the first insertion hole 40A of the leading edge is present on the lowermost end face 31C side among the three insertion holes 40A to 40C and is opened closer to the back surface 32A of the protruding wall portion 32.

In addition, the first insertion hole 40B which is present between the first insertion holes 40A and 40C and is located on the uppermost jaw section 33 side among the three first insertion holes 40A to 40C is formed further to the inside of a step portion on one leading end upper side than the convex portion in the above-described side surface view. The distance between the first insertion hole 40B and the first insertion hole 40A of the leading edge is made larger than the distance between the first insertion hole 40B and the first insertion hole 40C of the rearmost end. Further, in the same side surface view, an opening portion on the side surface 31A side of the first insertion hole 40B is disposed such that an upper edge portion thereof comes into contact with or intersects an extended line of the lower surface of the slit 38.

On the other hand, a rear end portion of the slit 38 becomes a large-diameter arc portion 38C which swells to the upper jaw section 33 side on the upper side as it goes to the rear end side, as shown in FIGS. 2 and 3, and the rear end side of the large-diameter arc portion 38C becomes the connection portion 39.

Here, the connection portion 39 is present in the vicinity of a corner portion on the leading end upper side of a step portion in which the first insertion hole 40B is formed, and located on the front upper side of the first insertion hole 40B. In this embodiment, the connection portion 39 is disposed on an extended line to the rear end side of the pressing surface 33A of the upper jaw section 33 or at a position slightly lower than the extended line.

In addition, the radial width of the arc in the large-diameter arc portion 38C is set wider than the width of the slit 38 extending parallel to the axis O.

Further, in the upper jaw section 33, a counterbore portion 43 which is opened to the upper surface of the upper jaw section 33 and the side surface 31B is formed further to the leading end side than the connection portion 39. The counterbore portion 43 is formed at a slant so as to communicate with the concave portion 23 which is opened to the upper surface of the protruding portion 15 of the holder main body 10A and forms a circular shape in cross-section centered on the central line of the clamp screw hole 22 in a state where the head member 30 is mounted on the holder main body 10A. In addition, a bottom 43A of the counterbore portion 43 is formed in an arc shape, as shown in FIGS. 2 and 3, and inclined at an acute angle to the side surface 31B so as to gradually retreat downward as it goes to the side surface 31A side and the rear end side of the head member main body 30A. In a state where the head member 30 is mounted on the holder main body 10A, the bottom 43A is disposed so as to protrude farther than the step surface 24 of the concave portion 23 in a direction of the central line of the clamp screw hole 22.

The cutting insert 50 for grooving work, which is mounted on the insert mounting seat 35 of the head member 30, is provided with an insert main body 51 formed of a hard material such as cemented carbide so as to have an outer shape in the form of a square bar with an approximately square cross-section. However, central portions of both the lower surface and the upper surface thereof are formed in V-groove shapes along a length direction and made so as to be able to come into contact with the pressing surface 33A and the pedestal surface 34A having the outer shapes of convex V shapes such that bisectors of the V shapes conform to each other. Further, at both end portions of the upper surface, cutting faces are respectively formed at positions retreated farther than the central portion, and cutting edges 52 which are used in grooving work or cutting-off work are formed at both end edge portions of these cutting faces.

The cutting insert 50 is inserted into the insert mounting seat 35 from the leading end side such that one cutting edge 52 is directed to the leading end side and also the V-groove shaped central portions of the lower surface and the upper surface face the pedestal surface 34A and the pressing surface 33A, with respect to the head member 30 entered a state where the head member 30 is mounted on the holder main body 10A. Then, when the end face of the insert main body 51 which is directed to the rear end side comes into contact with the contact surface 37, the cutting insert 50 is positioned in the direction of the axis O.

Then, as shown in FIGS. 4 and 5, by screwing a clamp screw 47 in the clamp screw hole 22 perforated in the protruding portion 15 of the holder main body 10A, the bottom 43A of the counterbore portion 43 of the head member main body 30A is pressed by a head portion of the clamp screw 47. In this way, the upper jaw section 33 is elastically deformed so as to bend to the lower jaw section 34 side with the connection portion as a fulcrum and the pressing surface 33A thereof presses the insert main body 51 to the pedestal surface 34A side, so that the cutting insert 50 is clamped. In the manner as described above, the detachable insert type cutting tool of this embodiment is constituted.

According to the head member 30 of the detachable insert type cutting tool constituted as described above, the concave curve inner surface 33C of the upper jaw section is formed to retreat further radially outward than the arc surface Sa extending along the concave curve inner surface 34C of the lower jaw section. That is, the clearance C5 between the concave curve inner surface 33C of the upper jaw section and the locus Xa of the work material which passes the inner corner portion 52a of the cutting edge of the cutting insert 50 is secured larger than the clearance C6 between the concave curve inner surface 34C of the lower jaw section and the locus Xa of the work material which passes the inner corner portion 52a of the cutting edge of the cutting insert 50.

Figure 10:
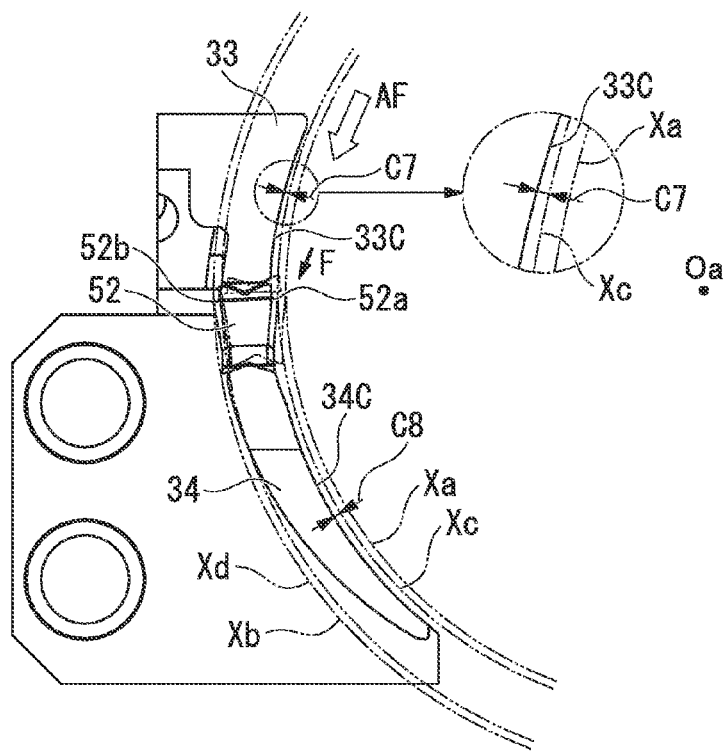
FIG. 10 is a diagram showing the relationship between the head member of the embodiment shown in FIG. 1 and the work material during cutting work.

Therefore, during actual cutting work, the head member 30 is deformed such that an upper end portion of the upper jaw section 33, that is, the portion of the upper jaw section 33 on the rotation center Oa side of the work material becomes more distant from the locus of the work material, and more specifically, so as to come closer to the cutting insert 50, as shown by an arrow AF in FIG. 10, as the holder main body 10A is deformed under the load F. According to the deformation, the cutting insert 50 moves in a direction in which the cutting load F is applied. At this time, as described above, since the clearance C5 between the concave curve inner surface 33C of the upper jaw section and the locus Xa of the work material which passes the inner corner portion of the cutting edge of the cutting insert 50 is set large, interference of the upper jaw section 33 with the work material can be avoided.

That is, as shown in FIG. 10, in the detachable insert type cutting tool described above, during actual cutting work, under the cutting load F, the cutting insert 50 is displaced in a direction (a lower left direction in FIG. 10) in which the cutting load F is applied, as shown by the arrow AF in FIG. 10, and the upper jaw section 33 and the lower jaw section 34 of the head member are also deformed in the same direction. At this time, while a clearance C8 between the concave curve inner surface 34C of the lower jaw section and a locus Xc of the work material which passes the inner corner portion 52a of the cutting edge of the cutting insert 50 is kept relatively wide, a clearance C7 between the concave curve inner surface 33C of the upper jaw section and the locus Xc of the work material becomes narrow. However, as described above, since the clearance C5 between the concave curve inner surface 33C of the upper jaw section and the locus Xa of the work material which passes the inner corner portion of the cutting edge of the cutting insert 50 is set large in advance, interference of the upper jaw section 33 with the work material can be avoided.

Further, the amount of retreat of the concave curve inner surface 33C of the upper jaw section from the arc surface Sa is set to be in a range of 0.2 mm to 0.7 mm. If it is within this range, even during cutting work, interference of the upper jaw section with the work material can be sufficiently avoided.

In addition, in a case where the amount of retreat of the concave curve inner surface 33C of the upper jaw section from the arc surface Sa is smaller than 0.2 mm, when cutting conditions are severe, a possibility that the upper jaw section may interfere with the work material remains. Further, in a case where the amount of retreat of the concave curve inner surface 33C of the upper jaw section from the arc surface Sa is larger than 0.7 mm, although interference of the upper jaw section 33 with the work material can be sufficiently avoided, the thickness of the upper jaw section 33 becomes thinner, so that the rigidity of the upper jaw section 33 becomes proportionally lower, and therefore, a problem arises in that it becomes difficult to obtain desired working accuracy.

In addition, the invention is not limited to the embodiment described above and various changes can be made within a scope which does not depart from the gist of the invention.

For example, in this embodiment, as the head member which is mounted on the leading end of the holder main body, an example of a head member which is obtained by forming it from a steel material of a predetermined shape by cutting work has been given and described. However, as shown in FIGS. 11 and 12, the head member can also be manufactured by an MIM (Metal Injection Molding) method in which after a material in which raw material fine powder of a steel material and a binder such as a resin are kneaded so as to make it have fluidity is injected into and molded in a split mold in which the shape of the head member main body is inverted, the binder is removed by heating and the raw material fine powder is then sintered.

Figure 11:
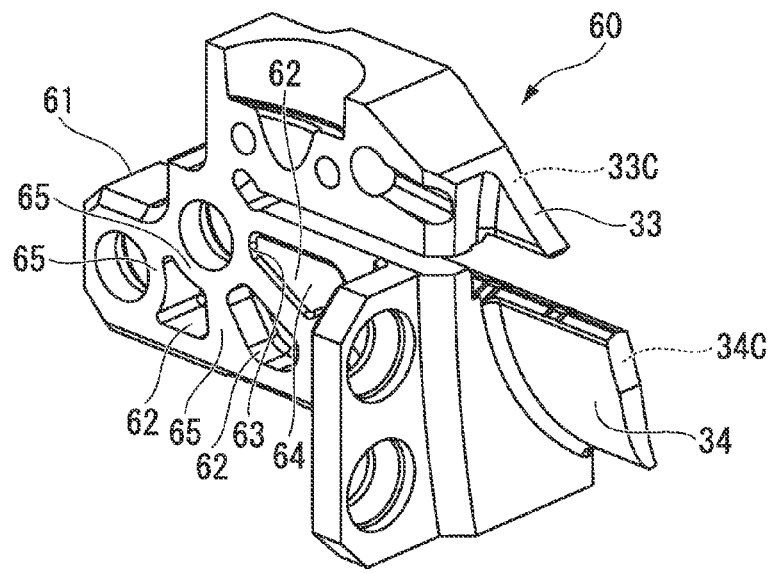
FIG. 11 is a perspective view of a head member of another embodiment of the invention, as viewed toward the leading end upper side and the leading end side from the left side.

In an example shown in FIG. 11, a rear end portion 61 of a head member 60 is provided with a large number of recesses 62, and the recess 62 has an inner wall surface 63 to be continuous in a circumference and a bottom 64 connected to the inner wall surface 63 over the entire circumference. A rib-shaped portion 65 towering up and protruding with respect to the bottom of the recess 62 is formed between the recess 62 and the upper surface, the rear end face, or the lower end face 31C of the head member main body. Then, a vibration generated in the insert main body from the cutting edge directed to the leading end side of the cutting insert during grooving and cutting-off work is dispersed through a plurality of rib-shaped portions 65 when it is propagated from the head member to the holder main body, and for this reason, the vibration is not directly propagated to the holder main body, so that generation of a chattering vibration or the like can be suppressed. Further, since a reduction in the weight of the head member main body can be attained due to the recess 62, the vibration itself is easily attenuated, and also due to this, it becomes possible to suppress generation of a chattering vibration.

In addition, also in the head member 60, the concave curve inner surface 33C of the upper jaw section is formed to retreat further radially outward than the arc surface Sa extending along the concave curve inner surface 34C of the lower jaw section.

Figure 12:
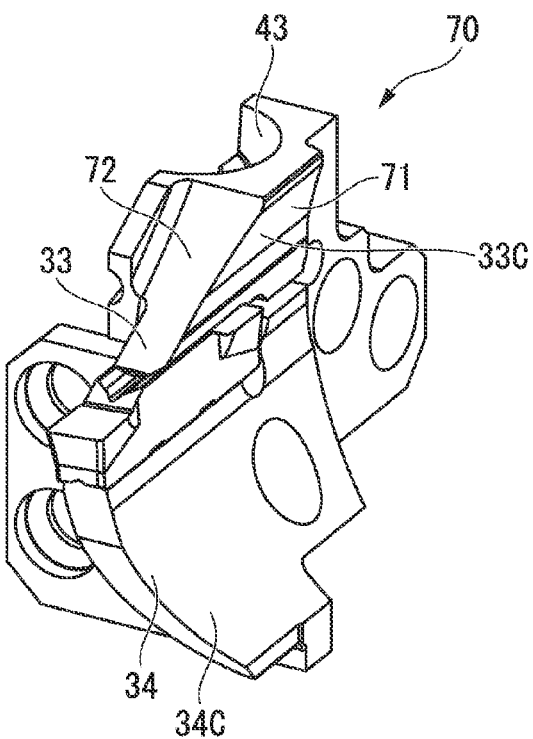
FIG. 12 is a perspective view of a head member of still another embodiment of the invention, as viewed toward the leading end upper side and the leading end side from the right side.

Further, in a head member 70 shown in FIG. 12, a portion 72 having a concave shape in a side view is formed by cutting out a front end portion of an upper jaw section 71 on a large scale, and in this way, the front end of an upper portion of the upper jaw section 71 is retreated so as to reach the vicinity of the counterbore portion 43. In this way, during cutting, a large space can be secured above the front end of the cutting insert, and good dischargeablity of chips can be secured by using this space.

In addition, also in the head member 70, the concave curve inner surface 33C of the upper jaw section is formed to retreat further radially outward than the arc surface Sa extending along the concave curve inner surface 34C of the lower jaw section.

Further, in the embodiment described above, an example has been given and described in which the concave curve inner surface 33C of the upper jaw section is formed to retreat further radially outward than the imaginary arc surface Sa extending along the concave curve inner surface 34C of the lower jaw section, the arc center of the concave curve inner surface 33C of the upper jaw section and the arc center of the concave curve inner surface 34C of the lower jaw section are set to be the same point, and the radius of curvature of the concave curve inner surface 33C of the upper jaw section is set larger than the radius of curvature of the concave curve inner surface 34C of the lower jaw section. However, a configuration is also acceptable in which the radius of curvature of the concave curve inner surface 33C of the upper jaw section is set to be the same as the radius of curvature of the concave curve inner surface 34C of the lower jaw section and the arc center of the concave curve inner surface 33C of the upper jaw section is shifted with respect to the arc center of the concave curve inner surface 34C of the lower jaw section. In this way, the invention can also be applied to a configuration in which the concave curve inner surface of the upper jaw section is formed to retreat further radially outward than the arc surface extending along the concave curve inner surface of the lower jaw section.

Figure 13:
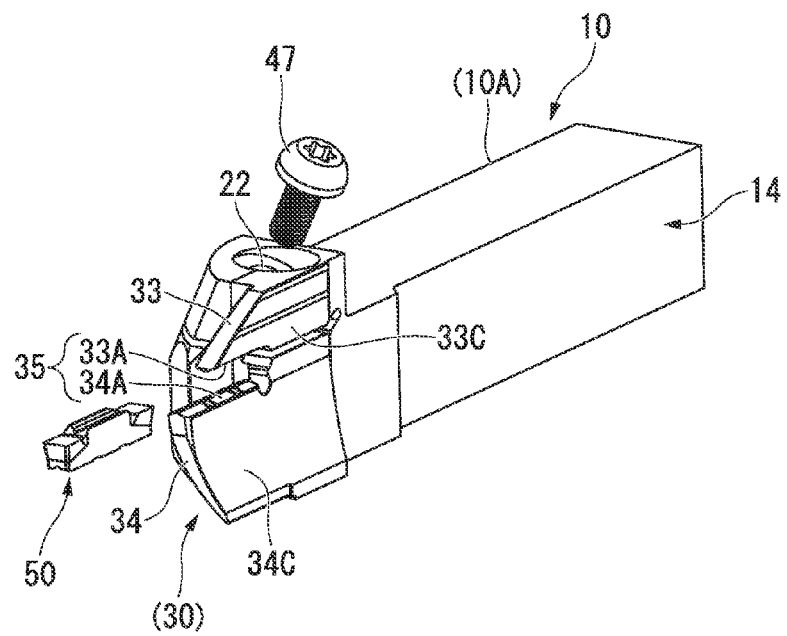
FIG. 13 is a perspective view showing another aspect of the cutting tool according to the invention.
Figure 14:
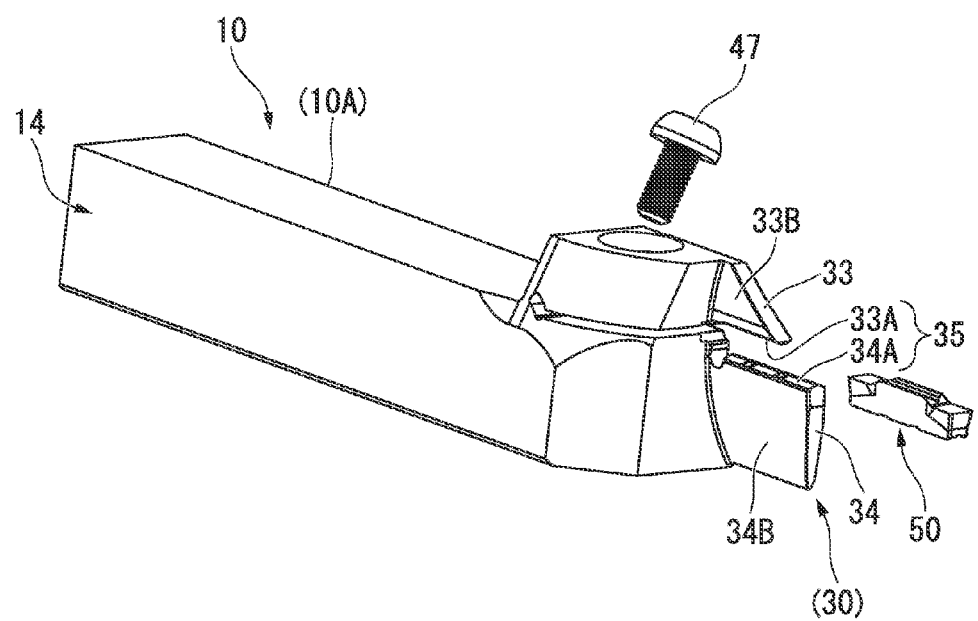
FIG. 14 is a perspective view of another aspect of the cutting tool according to the invention, as viewed from a direction different from that in FIG. 13.
Figure 15:
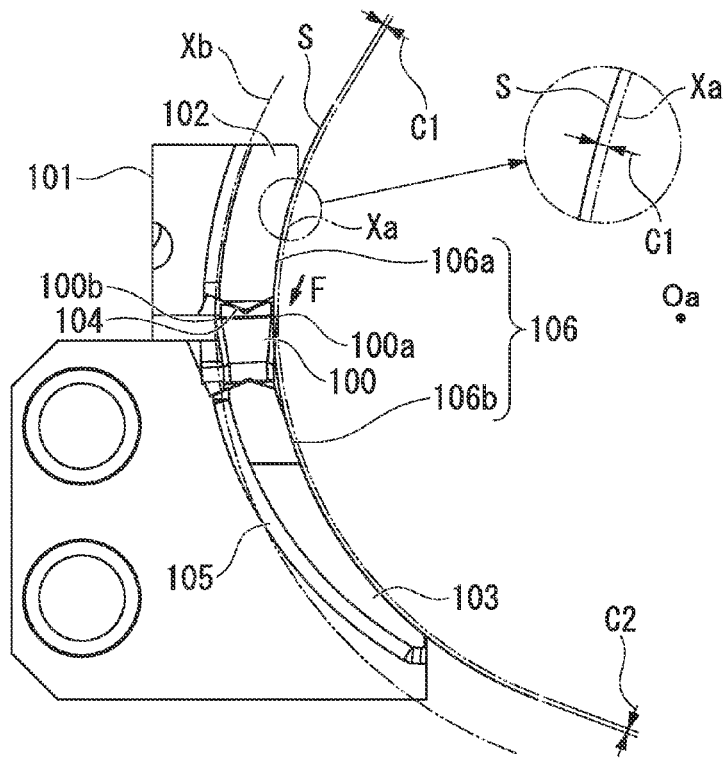
FIG. 15 is a diagram showing an example of a head member in the related art.
Figure 16:
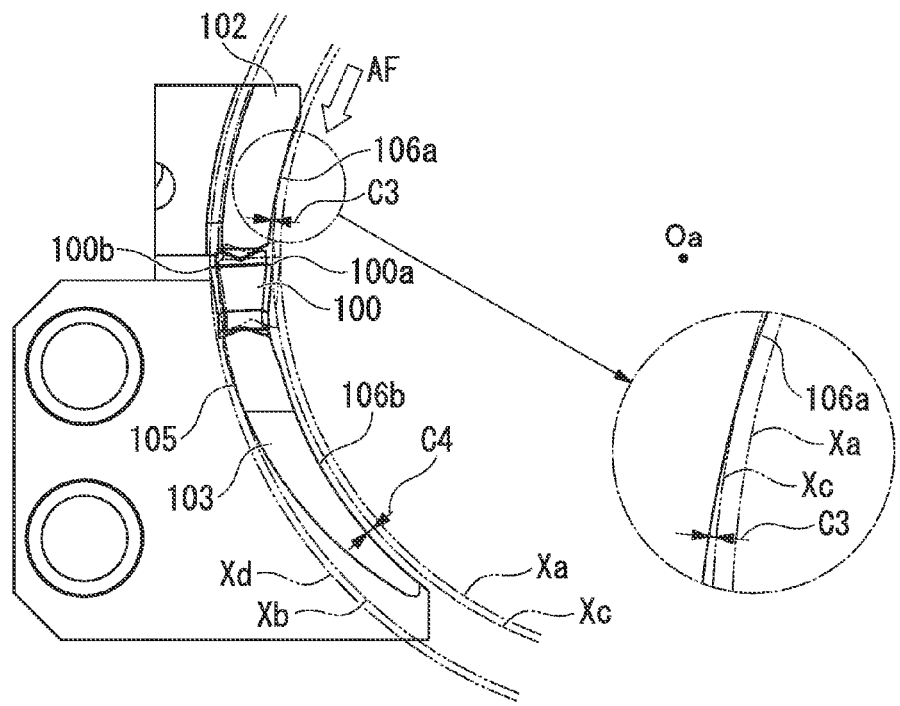
FIG. 16 is a diagram showing the relationship between the head member in the related art and a work material during cutting work.

In the embodiment described above, the cutting tool mainly composed of three components, that is, the holder main body, the head member, the cutting insert has been described. However, the cutting tool according to the invention is not limited to the cutting tool composed of three components as described above. For example, as shown in FIGS. 13 and 14, the invention can also be applied to a cutting tool composed of two components, that is, the holder 10 in which the head member 30 is integrated with the holder main body 10A, and the cutting insert 50 which is mounted on a leading end of the holder 10.

INDUSTRIAL APPLICABILITY

The invention relates to a head member constituting a portion of a detachable insert type cutting tool and a detachable insert type cutting tool which includes the head member.

According to the invention, interference of an upper jaw section with a work material during cutting work can be avoided while maintaining desired rigidity.

DESCRIPTION OF THE REFERENCE SYMBOLS

10: holder
10A: holder main body
16: mounting section
30, 60, 70: head member
30A: head member main body
31: rear end portion
31B: side surface
31C: lower end face
32: protruding wall section
32A: back surface
33: upper jaw section
33A: pressing surface
33B, 34B: convex curve outer surface
33C, 34C: concave curve inner surface
34: lower jaw section
34A: pedestal surface
35: insert mounting seat
50: cutting insert
52: cutting edge
Sa: (imaginary) arc surface extending along the concave curve inner surface of a lower jaw section

The invention claimed is:

1. A detachable insert type cutting tool comprising:
a cutting insert having a cutting edge; and
a holder having an insert mounting seat on which the cutting insert is detachably mounted, and an upper jaw section and a lower jaw section for pinching and fixing the cutting insert,
wherein the insert mounting seat is provided between the lower surface of the upper jaw section and the upper surface of the lower jaw section,
convex curve outer surfaces are formed on one side of the upper and lower jaw sections when viewed from the leading end sides of the upper and lower jaw sections,
concave curve inner surfaces are formed on the other side of the upper and lower jaw sections, and
the concave curve inner surface of the upper jaw section is disposed at a position retreated further radially outward than an arc surface extending along the concave curve inner surface of the lower jaw section in a state where the cutting insert is fixed to the insert mounting seat.

2. The detachable insert type cutting tool according to claim 1, wherein the amount of retreat of the concave curve inner surface of the upper jaw section from the arc surface is in a range of 0.2 mm to 0.7 mm.

3. A holder for a detachable insert type cutting tool comprising:
a holder main body;
an insert mounting seat which is provided in the holder main body and on which a cutting insert having a cutting edge is detachably mounted; and
an upper jaw section and a lower jaw section for pinching and fixing the cutting insert,
wherein the insert mounting seat is provided between the lower surface of the upper jaw section and the upper surface of the lower jaw section,
convex curve outer surfaces are formed on one side of the upper and lower jaw sections when viewed from the leading end sides of the upper and lower jaw sections,
concave curve inner surfaces are formed on the other side of the upper and lower jaw sections, and
the concave curve inner surface of the upper jaw section is disposed at a position retreated further radially outward than an arc surface extending along the concave curve inner surface of the lower jaw section in a state where the cutting insert is fixed to the insert mounting seat.

4. The holder for a detachable insert type cutting tool according to claim 3, further comprising:
a head member having the insert mounting seat, the upper jaw section, and the lower jaw section,
wherein the head member can be separated from the holder main body.

5. The holder for a detachable insert type cutting tool according to claim 4, wherein the amount of retreat of the concave curve inner surface of the upper jaw section from the arc surface is in a range of 0.2 mm to 0.7 mm.

6. The holder for a detachable insert type cutting tool according to claim 3, wherein the amount of retreat of the concave curve inner surface of the upper jaw section from the arc surface is in a range of 0.2 mm to 0.7 mm.

7. A head member for a detachable insert type cutting tool comprising:
- an insert mounting seat on which a cutting insert having a cutting edge is detachably mounted; and
- an upper jaw section and a lower jaw section for pinching and fixing the cutting insert,
- wherein the insert mounting seat is provided between the lower surface of the upper jaw section and the upper surface of the lower jaw section,
- convex curve outer surfaces are formed on one side of the upper and lower jaw sections when viewed from the leading end sides of the upper and lower jaw sections,
- concave curve inner surfaces are formed on the other side of the upper and lower jaw sections, and
- the concave curve inner surface of the upper jaw section is disposed at a position retreated further radially outward than an arc surface extending along the concave curve inner surface of the lower jaw section in a state where the cutting insert is fixed to the insert mounting seat.

8. The head member for a detachable insert type cutting tool according to claim 7, wherein the amount of retreat of the concave curve inner surface of the upper jaw section from the arc surface is in a range of 0.2 mm to 0.7 mm.

* * * * *